S. RICHARDSON.
ROAD GRADER AND SCRAPER.
APPLICATION FILED JUNE 16, 1909.
942,749.
Patented Dec. 7, 1909.
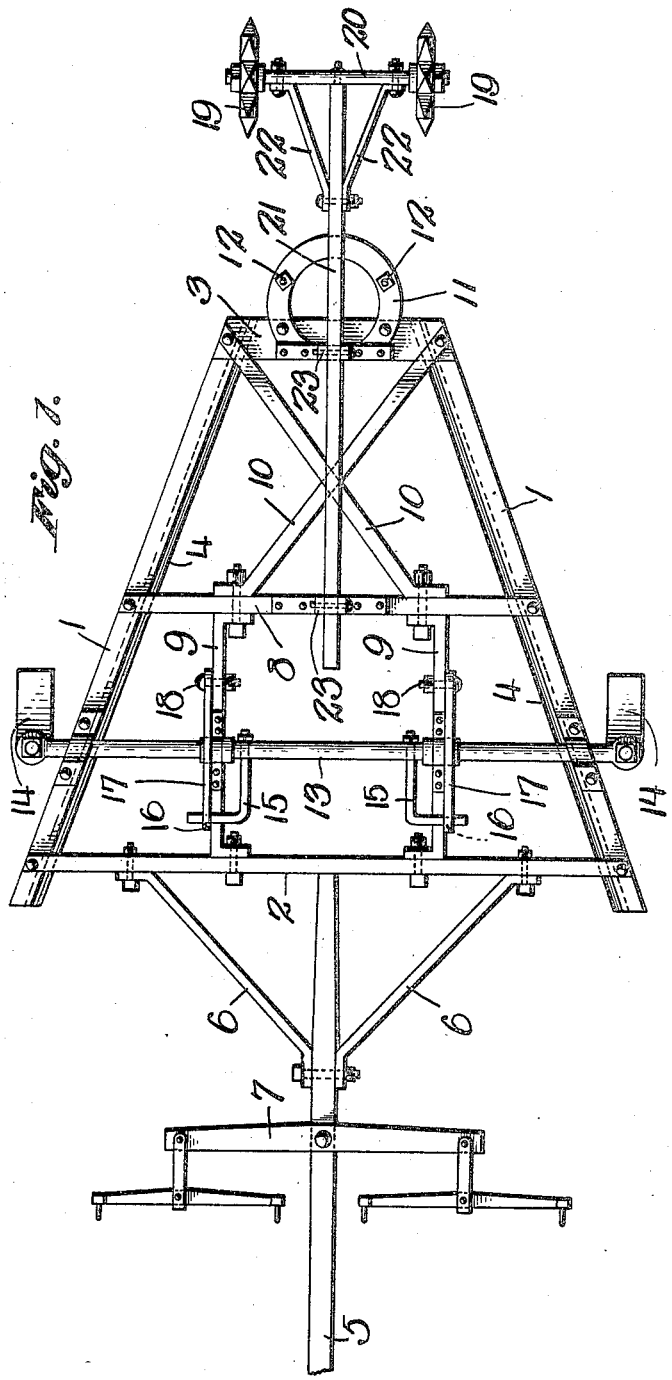
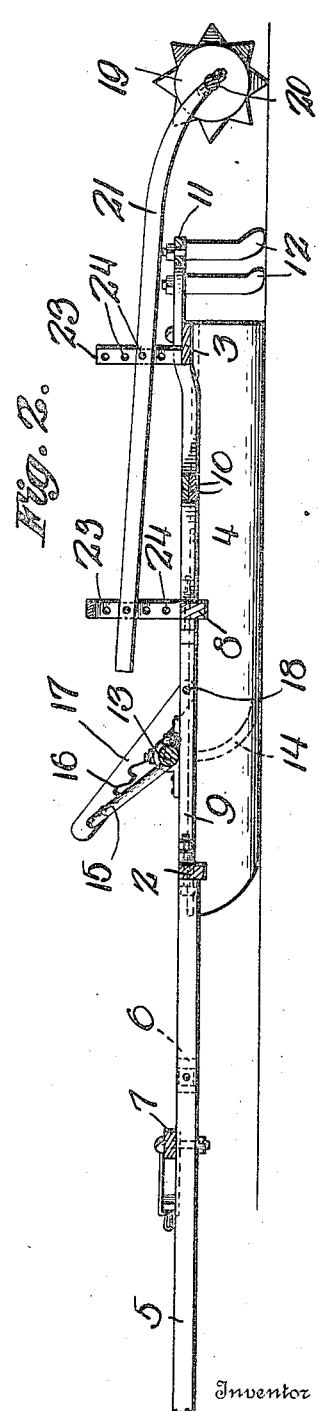
Witnesses
Chas. L. Richardson.
C. C. Hines.
Inventor
Samuel Richardson
By Victor J. Evans
Attorney

UNITED STATES PATENT OFFICE.

SAMUEL RICHARDSON, OF HOOVER, INDIANA.

ROAD GRADER AND SCRAPER.

942,749.  Specification of Letters Patent.  Patented Dec. 7, 1909.

Application filed June 16, 1909. Serial No. 502,534.

*To all whom it may concern:*

Be it known that I, SAMUEL RICHARDSON, a citizen of the United States, residing at Hoover, in the county of Cass and State of Indiana, have invented new and useful Improvements in Road Graders and Scrapers, of which the following is a specification.

This invention relates to road graders and scrapers, the object of the invention being to provide a machine which is simple of construction, and well adapted for general scraping and leveling work, and further to provide a simple and effective construction of means for regulating the action of the scraper blades and elevating the same above the surface of the earth to enable the implement to be conveniently drawn from place to place.

The invention consists of the features of construction, combination and arrangement of parts hereinafter fully described and claimed, reference being had to the accompanying drawing, in which:—

Figure 1 is a top plan view of a road grader and scraper embodying my invention. Fig. 2 is a central vertical longitudinal section of the same.

The implement comprises a substantially triangular frame embodying divergent side bars 1 connected at their forward or divergent ends by a front cross bar 2 and at their rear or convergent ends by a rear cross bar 3. The side bars 1 support depending scraper blades 4, which blades are thus arranged in divergent relation to gather and bring the surface earth to the center of the roadway in the usual manner. The blade may be made of any suitable material and provided with sharpened lower cutting edges, if desired. A draft tongue or pole 5 is secured to the front cross bar 2 by converging braces 6 and carries a doubletree or other draft alliance 7, by which the implement may be drawn in operation by animal power. The bars 1 are connected at a point about midway by a cross bar 8 which is connected with the front cross bar 2 by parallel longitudinal brace bars 9 and with the rear cross bar 3 by crossed brace bars 10, the parts being bolted or otherwise rigidly secured together to form an exceedingly strong and durable frame structure. An arcuate bracket 11 may be secured to and arranged to project rearwardly from the cross bar 3 and provided with harrow teeth 12 to loosen up the earth in the central line of draft of the implement at the middle of the roadway.

The bars 1 and 9 are provided with bearings for a transverse rock shaft or axle 13 the ends of which project beyond said bars 1 and carry downwardly and rearwardly curved runner shoes 14, preferably having flattened rear ends to bear upon the surface of the roadway and to serve both as supports for the forward end of the scraper frame and as leveling devices to smooth out the earth. When the scraper is in operation, the flat surfaces of these blades rest squarely upon the road surface to permit the cutting edges of the scraper blades 4 to have the desired scraping or cutting action. Secured to the shaft or axle 13 between the bars 9 are two L-shaped crank arms 15, the laterally extending portions of which form actuating handles by which the shaft may be rocked to elevate or depress the shoes 14 to lower or raise the front portion of the implement. These laterally extending portions of the cranks are adapted to engage rack teeth or notches 16 formed in the lower edges of a pair of locking bars 17 projecting forwardly from and pivotally connected with the bars 9 in rear of the shaft 13, as indicated at 18. By the use of locking bars of this character the crank arms may be secured in any desired position of adjustment to hold the runner shoes from movement in their lowered position or to sustain them in a variety of positions to adapt the scraper blades to bear lightly upon the road surface or to hold the forward portions thereof wholly suspended above such surface.

The rear portion of the implement is supported by a pair of toothed wheels 19 journaled upon the opposite ends of an axle 20 carried by a supporting bar 21 and reinforced therefrom by braces 22. The wheels are arranged at a suitable distance in rear of the cross bar 3 and the supporting bar 21 projects forwardly in the central line of the implement through U-shaped brackets 23 having horizontal terminal ends fastened to the bar 3 and bar 8. The side arms of these U-shaped brackets are each formed with alined series of openings 24 for the passage of a fastening pin 25 which extends through the adjacent portion of the bar 21, by which said bar may be adjustably secured at different elevations thereto to correspondingly support the rear portion of the implement.

It will thus be seen that this rear wheel support may be adjusted with the front runner shoes to regulate the action of the scraper blades on the road surface, to adapt them to act lightly or heavily, as occasion requires, as well as to support the implement wholly above the surface of the roadway to enable it to be conveniently transported for use from place to place.

A road grader and scraper constructed in accordance with my invention is exceedingly strong and durable, may be regulated to a fine degree to scrape the roadway with greater or less force, and may be much more conveniently drawn from place to place than devices of this kind of ordinary constructions.

I claim:—

1. A road grader and scraper comprising a triangular frame having divergent scraper blades, a transverse rock shaft journaled upon the forward portion of the frame and extending at its ends beyond the same, runner shoes upon the ends of said shaft, means for regulating the shaft and securing the same in adjusted position, and an adjustable support at the rear of the frame.

2. A road grader and scraper comprising a triangular frame provided with divergent scraper blades, a draft device at the forward end of the frame, a rock shaft journaled upon the forward end of the frame, runner shoes mounted upon said shaft, crank arms connected with the shaft, locking devices for locking said arms in a plurality of adjusted positions, a rear support for the frame, and means for adjusting the same.

3. A road grader and scraper comprising a triangular frame carrying divergent scraper blades, a draft appliance at the forward end of the frame, a support at the forward end of the frame having elements to travel upon the surface of the ground, means for adjusting said supports, a wheeled support for the rear end of the frame having a bar extending forwardly therefrom, and means for adjustably connecting said bar with the frame.

In testimony whereof I affix my signature in presence of two witnesses.

SAMUEL RICHARDSON.

Witnesses:
 GEO. W. WALTERS,
 ELIZABETH HOMBURG.